Jan. 26, 1965     T. C. FARRELL     3,166,937
COMPENSATING APPARATUS FOR FLUID METER
Filed Dec. 15, 1960     7 Sheets-Sheet 4
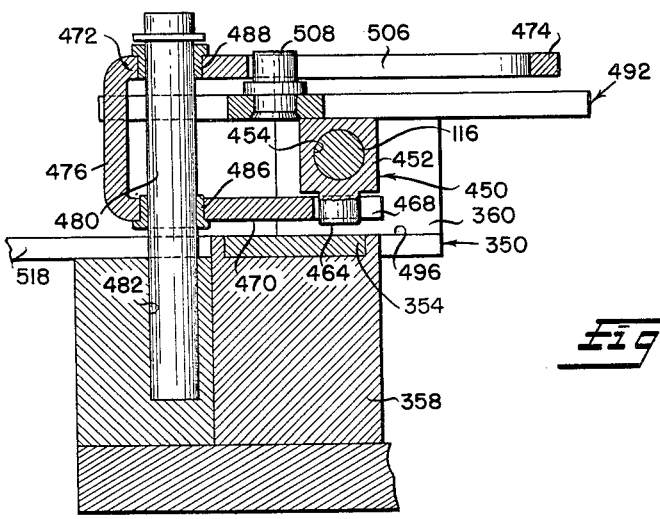
Fig. 4
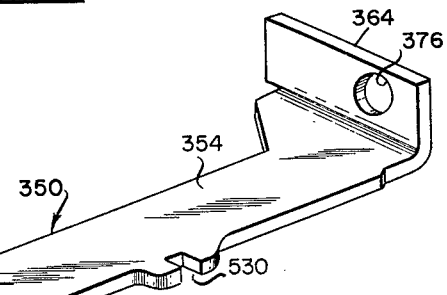
Fig. 5
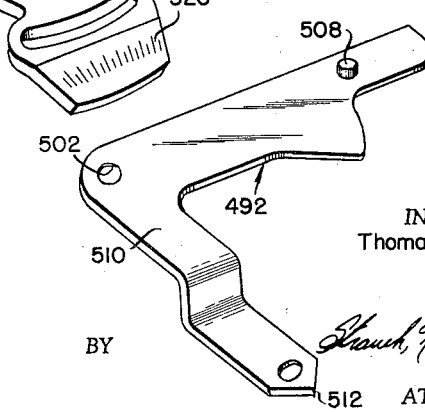
Fig. 6
Fig. 7
INVENTOR
Thomas Farrell
BY
ATTORNEYS

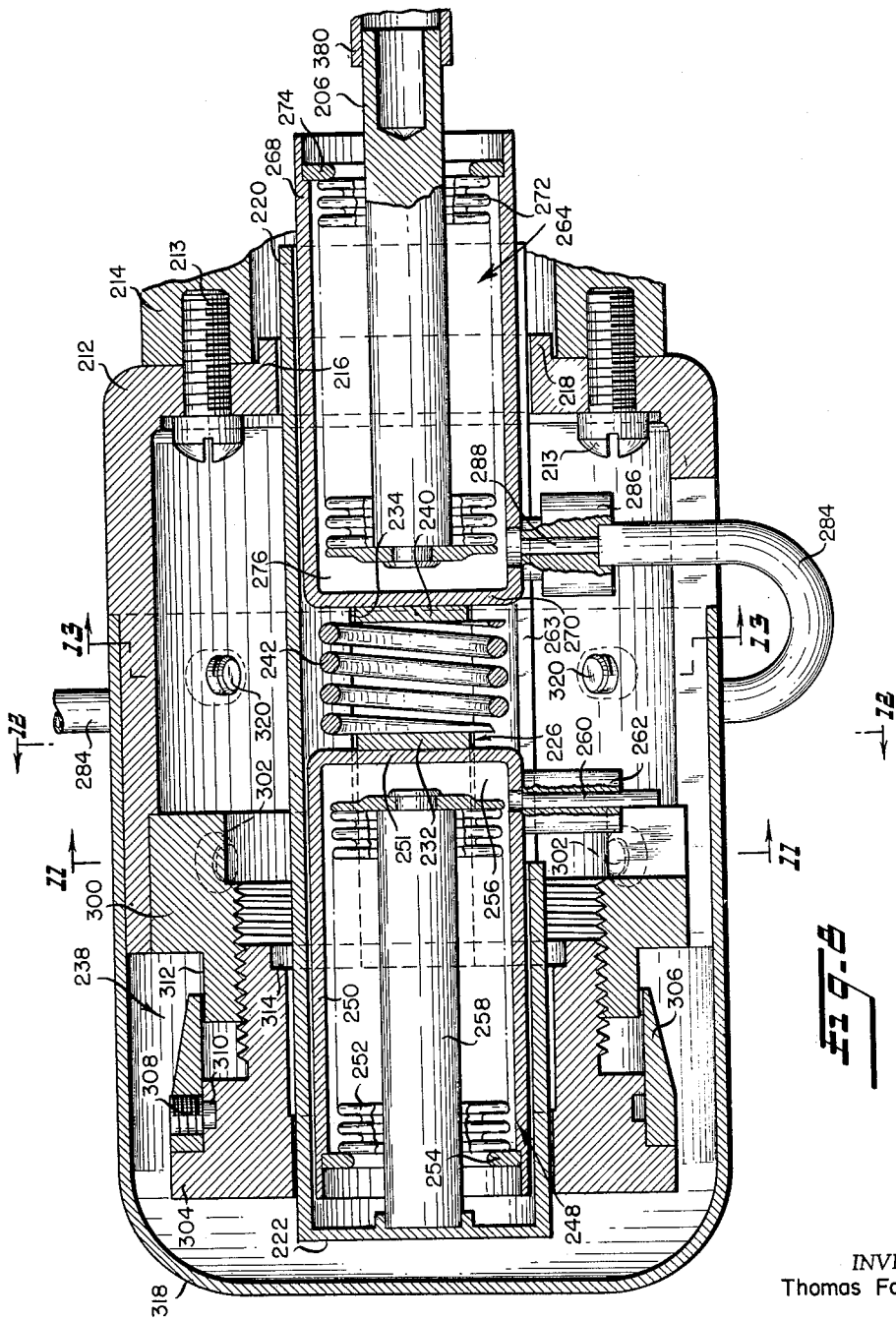

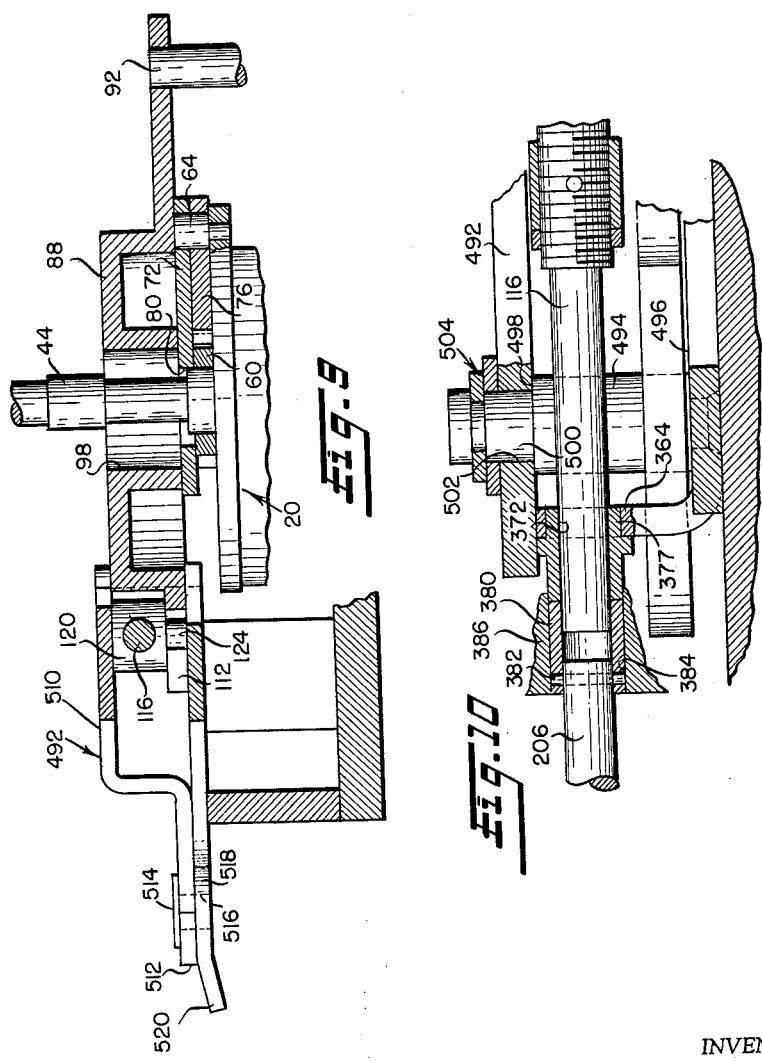

INVENTOR
Thomas Farrell

ATTORNEYS 3,166,937
COMPENSATING APPARATUS FOR
FLUID METER
Thomas C. Farrell, Glenshaw, Pa., assignor to Rockwell Manufacturing Company, Pittsburgh, Pa., a corporation of Pennsylvania
Filed Dec. 15, 1960, Ser. No. 76,049
24 Claims. (Cl. 73—233)

The present invention relates to fluid meters and more particularly to improvements in fluid meters which compensate for ambient and line fluid temperature changes and for variations of line fluid coefficients of thermal expansion. The invention in particular is an improvement on meter construction of the general type disclosed in United States Letters Patent No. 2,438,934 issued April 6, 1948 to Walter H. Marsh.

In dispensing fluids, and more particularly liquids such as gasoline and similar petroleum products, it is the general practice to measure the quantity of fluid being dispensed by its volume. A given volume of fluid, however, changes with variations of the temperature, the magnitude of the change in volume being dependent upon the characteristics of the fluid, such as its coefficient of thermal expansion. Consequently, the volumetric measurement of a fluid being dispensed is customarily computed at a standard reference temperature in order to assure that the mass or weight of the fluid dispensed does not vary with the fluid temperature for a given volumetric measurement. For instance, the mass of 10 gallons of a fluid at 90° F. is less than the mass of 10 gallons of the same fluid at 60° F. and when the fluid at 90° F. is cooled to 60° F., its volume will be correspondingly diminished. Consequently, it is necessary to compensate for the temperature variation by dispensing a volume of the 90° F. fluid in excess of 10 gallons in order to assure the delivery of a weight that is independent of the fluid temperature.

Prior meter constructions, such as that disclosed in the Marsh Patent No. 2,438,934, compensate for fluid temperature variations so that the meter registers a dispensed volume in terms of what the volume would be at a standard reference temperature which is preferably taken at 60° F. In the meter disclosed by Marsh, a bellows unit which is responsive to the fluid temperature controls the output speed of a variable ratio drive mechanism which has its input connected to the metering rotor element and its output connected to the register drive mechanism. This is accomplished in the Marsh meter by providing for a motion transmitting linkage between the variable speed ratio mechanism and the bellows unit so that movement of the bellows unit in response to fluid temperature variations is transmitted to the variable speed mechanism to control the output speed of the mechanism and thereby corrects the registration of the volume of fluid being dispensed for changes in the fluid temperature. Marsh's temperature responsive bellows unit is disclosed to be disposed in a well formed in the meter casing so that it is substantially thermally isolated from the surrounding ambient temperature and, consequently is not affected by ambient temperature changes that would otherwise produce inaccuracies in metering registration. However, the bellows unit is not actually disposed in the stream of fluid flowing into the meter and therefore does not accurately reflect the temperature of the fluid being metered. As a consequence, uncompensated metering inaccuracies result from the changing temperature conditions of the fluid.

To overcome this shortcoming of the Marsh meter, it has been proposed to locate the bellows unit in the inlet port of the meter so that it is positioned in the path of fluid moving through the meter. However, by this proposed construction the bellows unit is located outside of the metering chamber and where it is close to the exterior of the meter and the connecting pipeline and, consequently, is appreciably affected by changes in ambient temperature to thereby introduce corresponding inaccuracies into the meter registration whenever a change in ambient temperature occurs.

To overcome these difficulties, a special dual bellows assembly is proposed and has two bellows elements arranged to provide a coordinated unitary movement and separate closed thermostatic chambers filled with temperature responsive liquid to facilitate expansion and contraction of the bellows elements as a result of variations in temperature to which the liquid in each of the chambers is subjected. One thermostatic chamber is positioned in the meter inlet port in the path of the fluid stream and the other thermostatic chamber is exposed to the atmosphere so as to be responsive to ambient temperature. The movement of the bellows elements are coordinated to accurately compensate for variations in fluid and ambient temperatures.

A further shortcoming of the Marsh temperature compensation meter structure resides in the relatively high magnitude of the load exerted by the motion transmitting linkage on the temperature responsive bellows. In both the Marsh temperature responsive bellows unit and the proposed temperature responsive dual bellows assembly, the bellows are surrounded by a relatively incompressible liquid, the volume of which expands and contracts to cause corresponding axial compression and expansion of the bellows. Thus, external forces tending to expand the bellows element are opposed by an unyieldable pressure exerted by the relatively incompressible surrounding liquid in the liquid chamber. As a consequence, it is necessary to provide the bellows with a wall thickness that is adequate to prevent structural failure under given conditions of external load application.

In the Marsh meter, the motion transmitting linkage is provided with a simple lever mechanism having a variable mechanical advantage which can be adjusted to vary the degree of movement of the linkage components connected to the variable ratio drive mechanism relative to the movement of the bellows. The adjustment compensates for variations in coefficients of expansion when different fluids are metered to provide for an accurate registration of the fluid volume passing through the meter.

In operation of the Marsh meter, the variable ratio drive mechanism imposes an appreciable and variable load on the motion transmitting linkage which is opposed by a constant energy absorbing device such as a constant deflection spring to prevent movement of the linkage from its adjusted position. The constant force exerted by the spring must be equivalent to the maximum force exerted by the variable ratio drive mechanism and the direction of the spring force is in such a direction that it is transmitted serially through the component parts of the motion transmitting linkage including the adjustable lever mechanism to the bellows unit. Since the components of the adjustable lever mechanism are disposed in series relationship to the constant deflection spring, to the bellows and to the other parts of the motion transmitting linkage, an appreciable and magnified load is imposed on the bellows in opposition to the pressure exerted by the liquid surrounding the bellows, when the lever mechanism is adjusted to provide for a maximum mechanical advantage. Thus, the bellows tends to be deformed outwardly as a result of the application of the external axial load and it is necessary to construct the bellows with a wall thickness of substantially large magnitude to prevent structural failure.

Large wall thickness, however, reduces the accuracy of the movement of the bellows in response to changes in temperature since the magnitude of deflection of a bellows per unit change in temperature is inversely proportional to the thickness of the bellows wall. Thus, as the bellows wall thickness is increased, a greater liquid pressure is required to attain a given amount of axial deflection of the bellows per unit change in temperature. As a consequence, a bellows having proportionally great wall thickness cannot be deflected as much as a bellows with a smaller wall thickness for a given temperature change and consequently the accuracy of the temperature compensation is reduced by a magnitude corresponding to the reduction in unit deflection. With the proposed dual bellows assembly the wall thickness of the bellows is especially critical since the movement of the two bellows is coordinated for response to slight variations in line fluid and ambient temperatures.

In order to overcome the foregoing difficulties, the present invention contemplates and has as its purpose a special motion transmitting linkage that prevents the application of magnified or multiplied loads on the bellows but which retains a lever mechanism having an adjustable mechanical advantage to compensate for variations in different fluid coefficients of expansion. Consequently, the wall thicknesses of the bellows, according to the present invention, are correspondingly reduced to permit a greater deflection per unit temperature change and, therefore, to appreciably improve the accuracy of the meter while at the same time, retaining the feature of coefficient of expansion adjustment. Thus, by reduction of the wall thickness of the bellows and by the coordinated movement of the dual bellows assembly in respective response to ambient and line fluid temperatures, a corresponding and substantial increase in the accuracy of temperature compensation is attained.

It is therefore the primary object of the present invention to provide a novel and improved temperature compensating device for a fluid meter.

Another object of the present invention is to provide a novel fluid meter which measures a volume of fluid passing through the meter housing and which automatically and accurately compensates for variations in temperature of the fluid from a given standard temperature substantially free from ambient temperature influences.

A further object of the present invention is to provide a novel and improved temperature compensating assembly for fluid meters which is capable of accurately altering the speed ratio between the rotating component of the meter and the recording or counting means, in strict accordance with the volumetric changes brought on by temperature changes in the fluid being measured.

A further object of the present invention is to provide a novel and improved temperature compensating assembly for fluid meters which can be adjusted to accommodate fluids of different coefficients of expansion.

A more specific object of the present invention is to provide a novel adjustable motion transmitting linkage for a fluid meter which serves to couple a bellows unit responsive to ambient and line fluid temperatures to a variable ratio meter register drive mechanism for altering the speed ratio between the metering element driven shaft and the meter register drive shaft to thereby introduce the necessary compensation factor for causing the meter register to record the volume of liquid flowing through the meter in terms of what the volume would be at a reference temperature, such as 60° F.

Still another object of the present invention is to provide an improved temperature compensated fluid meter having a variable ratio drive mechanism interconnecting the metering element driven shaft with the meter register drive shaft and a line fluid temperature sensitive unit, and embodying an improved motion transmitting connection between the temperature sensitive unit and the variable ratio drive mechanism which results in improved metering accuracy.

A further object is to provide the linkage assembly according to the preceding object wherein the temperature sensitive unit has two bellows respectively responsive to ambient and line fluid temperature variations, which bellows cooperate through a special connection to produce a coordinated unitary movement that compensates both for changes in line fluid and ambient temperature changes for accurately varying the speed of the register or counter drive shaft.

Still a further object of the present invention is to provide for an improved fluid meter temperature compensating device having a novel dual bellows temperature sensitive unit which is operative to accurately compensate for variations in metered fluid temperature from a given standard temperature substantially free of ambient temperature influences and which embodies a special calibration structure for initially adjusting the unit for departure of line fluid temperature from a given standard fluid temperature.

These and other objects and advantages of the present invention will become apparent to those skilled in the art from the scope of the appended claims and from the following description in reference to the accompanying drawings wherein:

FIGURE 4 is a vertical section taken along line 4—4 of FIGURE 2;

Figure 2:
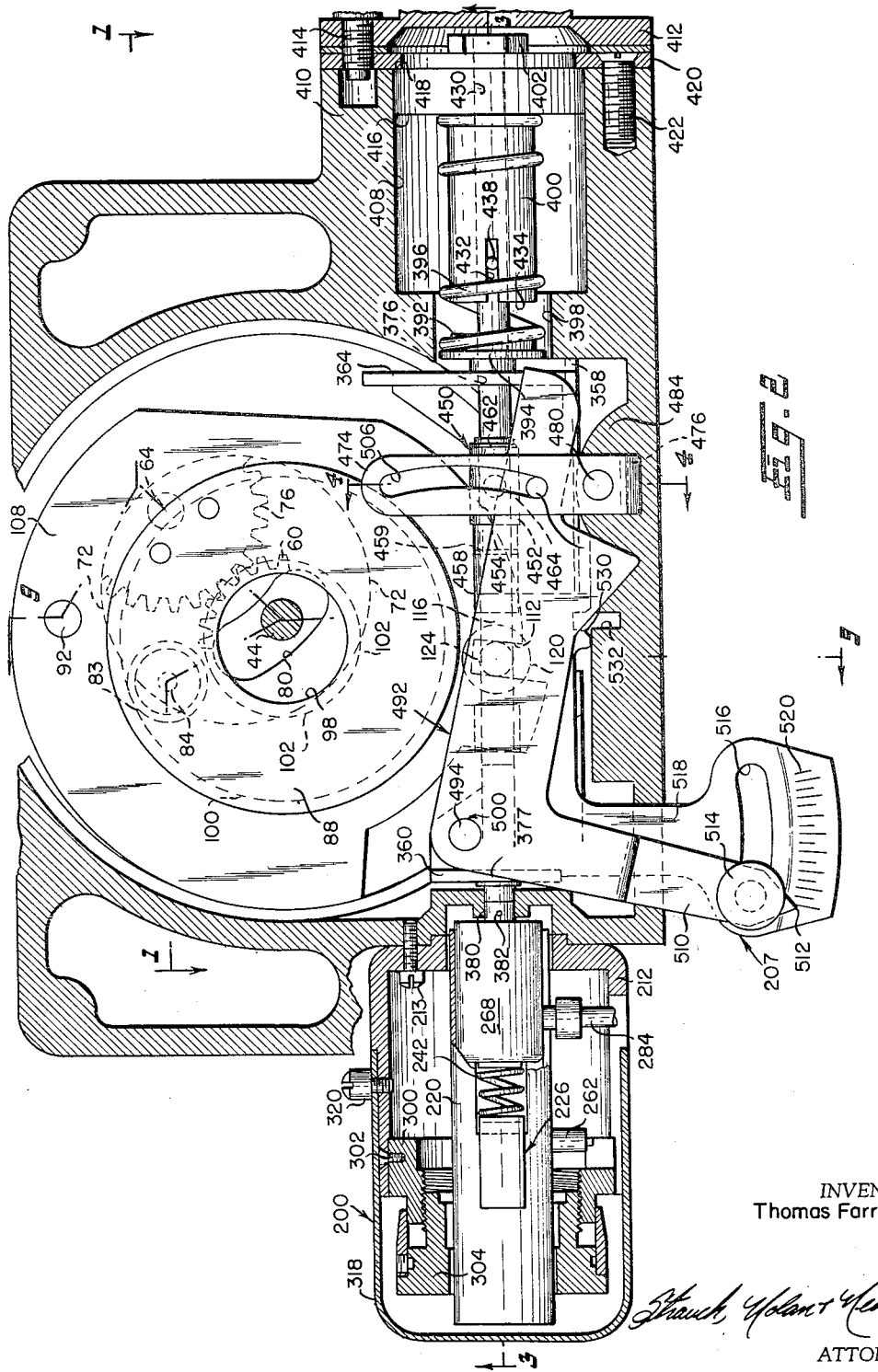
FIGURE 2 is a horizontal section view taken along line 2—2 of FIGURE 1.
Figure 3:
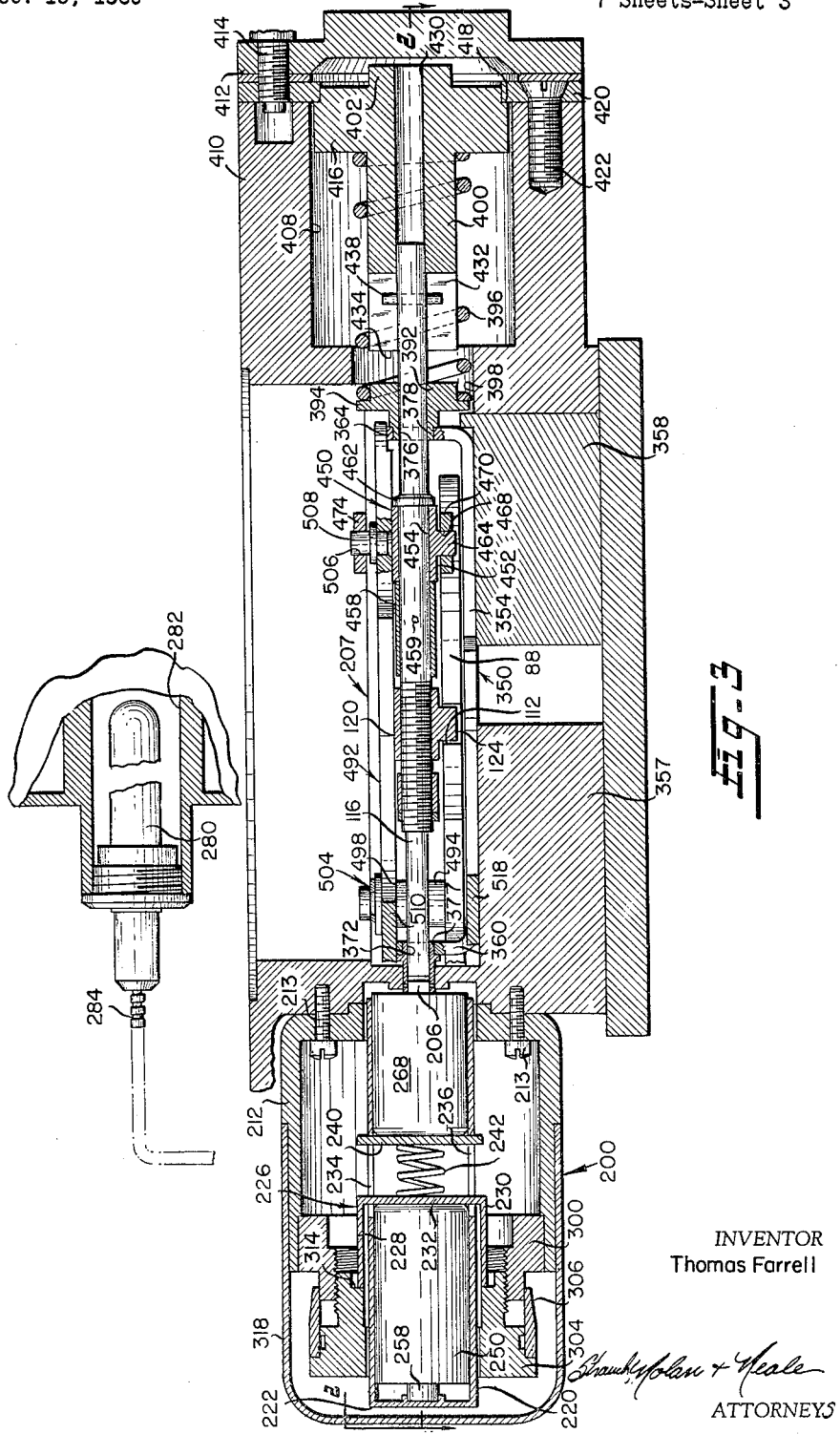
FIGURE 3 is a vertical section taken along line 3—3 of FIGURE 2.
Figure 11:
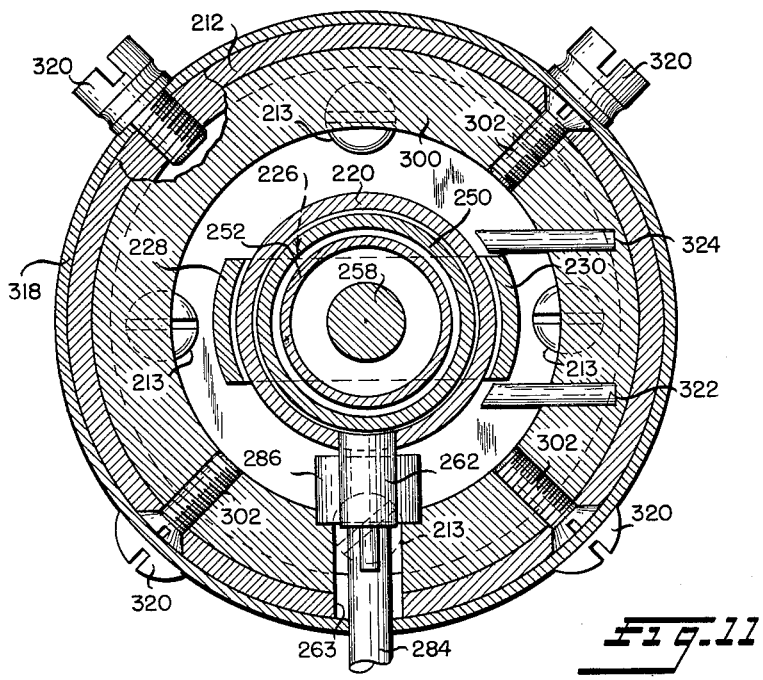

FIGURES 5, 6 and 7 respectively are perspective views of various component parts of the temperature compensator of the present invention;

FIGURE 8 is an enlarged view of the left end of FIGURE 3 showing the details of the dual bellows temperature responsive element more clearly;

FIGURE 9 is a vertical section view taken along line 9—9 of FIGURE 2;

FIGURE 10 is a fragmentary enlarged view of FIGURE 3 showing details of the linkage assembly;

FIGURE 11 is a section taken substantially along line 11—11 of FIGURE 8;

FIGURE 12 is a section taken substantially along line 12—12 of FIGURE 8; and

Figure 13:
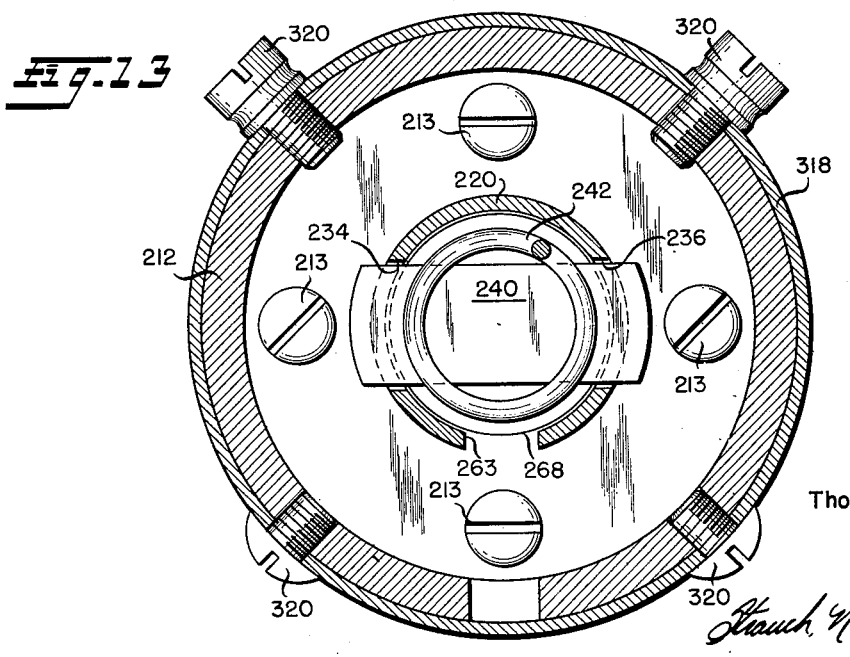

FIGURE 13 is a section taken substantially along line 13—13 of FIGURE 8.

The meter of the present invention is provided with a variable ratio drive mechanism to vary the registration of metered volume according to changes in fluid temperature being metered and changes in the characteristics of the fluid itself such as the fluid coefficient of expansion. Briefly, a temperature sensitive bellows unit generally indicated at 200 in FIGURE 2 effects adjustment of a cam member 88 (FIGURES 1 and 2) through an interconnecting mechanical linkage. Movement of cam member 88 governs the ratio of speed of the register drive shaft to the metering element driven shaft which respectively constitute the output and input of a variable ratio drive mechanism.

The meter register drive of the present invention including the variable ratio drive mechanism may be the same as that disclosed in Marsh Patent No. 2,438,934 to which reference is made for a detailed description thereof.

Figure 1:
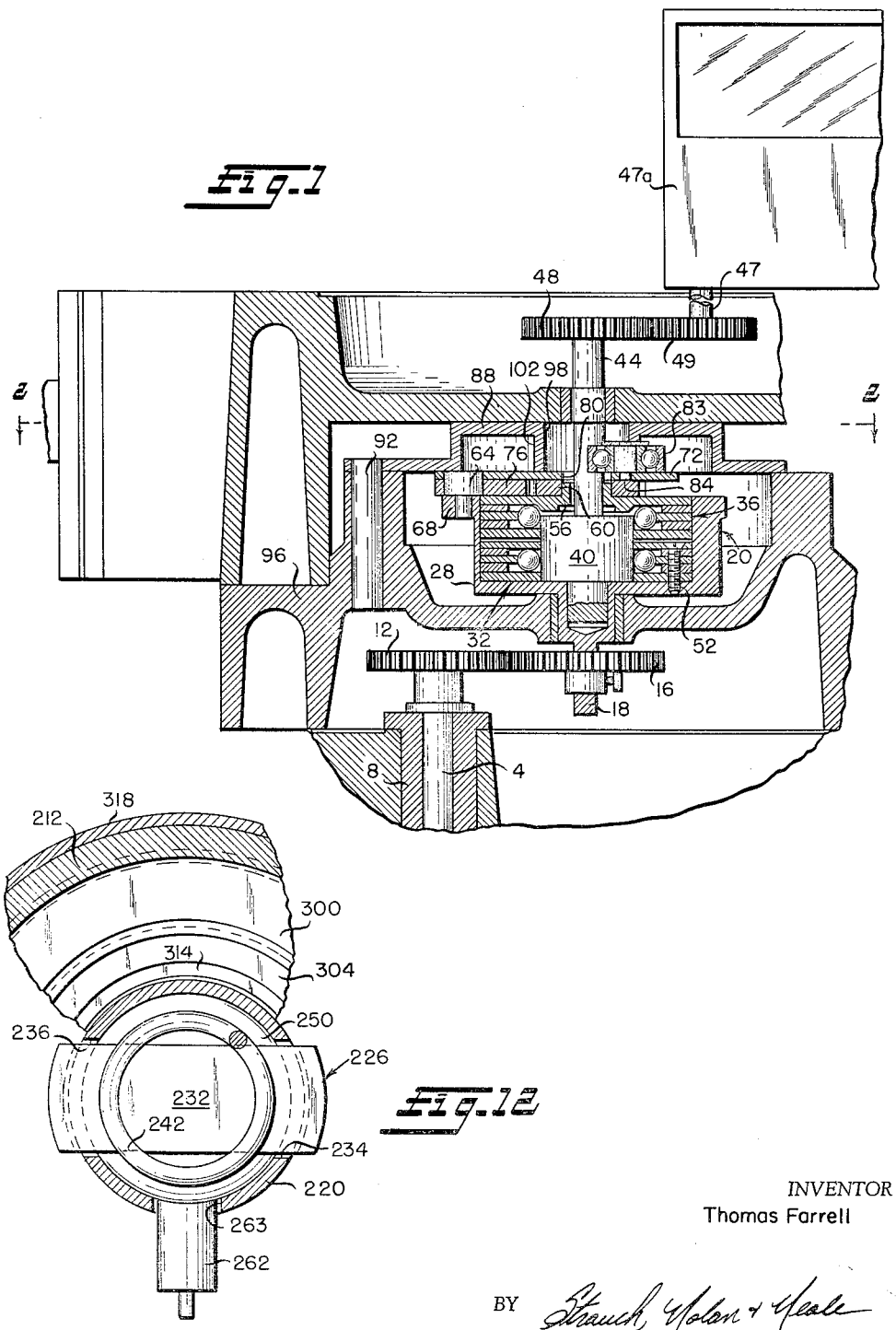
FIGURE 1 is a fragmentary view, partly in vertical section of a fluid meter showing a variable ratio drive mechanism therefor.

With reference to FIGURE 1 of the drawings, the meter register drive comprises a shaft 4 journalled in bushing 8 and driven by the metering element output shaft and gearing (not shown). At the upper end of shaft 4, a gear 12 is fixed which meshes with a gear 16 fixed to a depending stub shaft 18 mounted rigid with a cup-shaped variable ratio driving member 20. By this construction, rotation of shaft 4 in one direction imparts rotation to member 20 in the opposite direction.

With reference to FIGURES 1 and 2, driving member 20 is formed with a hollow cylindrical body or cup 28 which houses a multiple one-way drive comprising lower and upper unidirectional ball clutch assemblies indicated generally at 32 and 36 respectively. Received in cup 28 and surrounded by clutch assemblies 32 and 36 is a drum 40 fixedly secured to an output shaft 44 which drives a register shaft 47 of the meter register 47a through a gear train formed by intermeshing gears 48 and 49. Clutches 32 and 36 are each constructed to engage and rotate drum 40 when they are rotated in a clockwise direction as viewed from above. Clutch 32 is secured to cup 28 as at 52, while clutch 36 rides over drum 40 when drive member 20 is rotated, until the top portion of member 20 is rotated relative to cup 28 in a clockwise direction by gear 60. When clutch 36 is rotated relative to cup 28 in a clockwise direction, clutch 36 frictionally engages drum 40 and imparts an overdrive thereto as will become apparent as the description proceeds.

An apertured boss 56 on clutch assembly 36 relatively rotatably surround shaft 44 and is received and suitably secured in the center hole of a gear 60. An upstanding pin 64 is fixedly mounted in flange 68 formed integral with drive member 20. Pivoted about the axis of pin 64 is a plate 72 having a gear segment 76 fixed thereto in constant meshing engagement with gear 60. Plate 72 is formed with a curved slot 80 through which shaft 44 freely passes. Plate 72 and gear segment 76 are therefore free to pivot about the axis of pin 64 as they rotate with drive member 20. Plate 72 also carries a cam follower roller 83 journalled on a pin 84 which is fixed to plate 72.

With continued reference to FIGURES 1 and 2, a cam member 88 overlies plate 72 and is pivoted about the axis of a pin 92 which extends through a flange portion 108 of cam 88 and which is non-rotatably received in a base formed in a casing section 96 of the meter. The cam, having a central opening 98 through which shaft 44 freely extends, has a guide channel on its lower side formed by guide walls 100 and 102, the guide channel receiving roller 83 therein with a running clearance. Cam 88, being pivoted at 92, is thereby adapted to be adjusted to various positions of concentric or eccentric relationship to shaft 44.

For adjustment purposes, the outwardly extending flange 108 of cam 88 has a notch 112 (FIGURE 2) cut therein diametrically opposite pin 92. A threaded axially shiftable adjustment rod 116 (FIGURE 3) mounted in the meter has a stud 120 threadably received thereon, which stud has a downwardly extending lug 124 (FIGURE 3) projecting into notch 112 in cam 88. By connecting rod 116 to a temperature sensitive unit such as bellows assembly 200 (FIGURE 2) so as to cause axial displacement of rod 116 in response to movement of the bellows, the position of cam 88 and hence the ratio of the variable drive, is automatically adjusted in response to line fluid temperature changes.

From the foregoing, it is apparent that roller 83, plate 72, gear segment 76, and gear 60 rotate with the driving member 20 about the axis of shaft 44. Since roller 83 follows the guide channel provided by cam walls 100 and 102, any eccentricity of walls 100 and 102 from the axis of rotation of member 20, will cause roller 83 to oscillate toward and from shaft 44. Movement of the roller toward shaft 44 causes plate 72 and gear segment 76 to rotate counterclockwise about pin 64, as viewed from above in FIGURE 2, thus imparting clockwise movement to gear 60 and hence to upper clutch assembly 36, the latter thus engaging drum 40 and imparting an overdrive thereto so as to drive shaft 44 at an increased rate. Movement of the roller away from shaft 44 results in counterclockwise rotation of clutch 36 disengaging it from drum 40 and re-establishing the drive from clutch 32. Therefore, the eccentric position of cam 88 governs the amount of roller oscillation and period of overdrive and by adjusting the position of the cam member 88, the ratio of the variable drive is adjusted.

The structure described thus far is substantially the same as the variable ratio drive mechanism disclosed in United States Patent No. 2,438,934; however, it will become apparent that as employed with the present invention, the drive mechanism constitutes a part of an improved meter combination.

In accordance with the present invention, longitudinal movement of rod 116 (and hence regulation of the variable ratio drive) is controlled by temperature sensitive unit 200. In response to a temperature change sensed by unit 200, a rod 206 (FIGURE 3) of unit 200 is coupled by a special motion transmitting linkage assembly 207 to impart movement to rod 116 for adjustment of cam 88 as will be more fully described as the description proceeds.

Referring now to FIGURES 2, 3 and 8, temperature sensitive unit 200 comprises a hollow cylindrically-shaped housing 212 which is rigidly secured by means of screws 213 to an apertured boss 214 formed integral with the meter casing. Housing 212 is provided with an end wall 216 having a boss 218 which telescopically aligns with boss 214. Slidably mounted in boss 218, in coaxial relationship with housing 212, is a hollow cylinder 220 which is open at its right-hand end and which is closed at its left-hand end by a transverse end wall 222 as best seen from FIGURE 8.

As best shown in FIGURES 8, 11 and 12, a U-shaped spring retainer 226 is formed with parallel arms 228 and 230 (FIGURE 11) connected together by a cross piece 232 (FIGURES 8 and 12) which extends transversely across the interior of cylinder 220 and which protrudes freely through diametrically opposed circumferentially positioned slots 234 and 236 formed in cylinder 220. Arms 228 and 230 are arcuately curved to correspond to the cylindrical contour of cylinder 220 and extend on both sides toward the closed end of cylinder 220 in spaced relationship to the outer periphery thereof. Retainer 226 is fixedly but adjustably held against axial displacement to the left, as viewed from FIGURE 8, by means of a calibration unit 238 for a purpose as will presently become apparent.

Axially opposite retainer 226 is a spring retainer 240 which extends transversely across the interior of cylinder 220 in parallel relationship to spring retainer cross piece 232 and which protrudes freely through slots 234 and 236 as best shown in FIGURE 13. Mounted in cylinder 220 axially between retainers 226 and 240 is a constant deflection coil compression spring 242 which reacts against retainer 226 to bias retainer 240 to the right, as viewed from FIGURE 3, such that the flat right hand side face of retainer 240 abuts the axially extending edges of cylinder 220 which form slots 234 and 236 to thereby resiliently urge cylinder 220 to the right as viewed from FIGURES 3 and 8.

With continued reference to FIGURE 8, ambient temperature bellows unit 248 is axially positioned in cylinder 220 on the side of retainer 226 opposite from spring 242 and comprises a hollow cylindrically shaped metal shell 250 which is open at its left-hand end and closed at its right-hand end by a transverse wall 251. Shell 250 is slidably displaceable in cylinder 220 and wall 251 is held in abutment with retainer 226. Axially mounted within shell 250 is a flexible corrugated axially expansible and contractable bellows 252 which is opened at its left-hand end and closed at its right-hand end as viewed from FIGURE 8. Bellows 252 is axially fixedly secured in fluid tight relationship at its open end to an annular support plate 254 secured to and extending radially inwardly from shell 250. By this construction, bellows 252 is freely axially expansible and contractable in shell 250 and forms with shell 250 a closed fluid chamber 256.

In order to transmit movement between bellows 252 and cylinder 220, a rigid rod 258 is fixedly secured at one end to cylinder wall 222 and projects coaxially into the interior of bellows 252. At the opposite end, rod 258 is fixedly secured to the transverse end wall portion of bellows 252 so that axial expansion and contraction of bellows 252 causes rod 258 to be axially displaced in opposite directions.

An inlet port 260 to chamber 256 is formed in a block 262 extending through slot 263 of cylinder 220. In the assembly of unit 220, a suitable temperature responsive liquid is admitted through port 260 to fill chamber 256. Port 260 then is sealed by solder prior to service so as to completely close chamber 256. By this construction it will be appreciated that a rise in ambient temperature will cause the liquid in chamber 256 to expand axially against the closed end of bellows 252 to axially urge rod 258 against cylinder end wall 222 thereby axially displacing cylinder 220 to the left, as viewed from FIGURE 8, against the bias of spring 242.

With continued reference to FIGURES 3 and 8, a bellows unit 264 responsive to line fluid temperature being metered is coaxially positioned in the right-hand end of cylinder 220 opposite from unit 248. Bellows unit 264 comprises an outer metal cylindrically shaped shell 268 which is mounted for axial sliding movement in cylinder 220 and which has a closed end 270 abutting retainer 240 on the opposite side from spring 242. As viewed from FIGURE 8, shell 268 is opened at its right-hand end and axially receives an axially flexible corrugated bellows 272 which is closed at its left-hand end and opened at its right-hand end. Bellows 272 is axially fixedly secured at its open end to a radially inwardly extending annular support plate 274 which is secured to shell 268 adjacent its open end. Bellows 272 forms a chamber 276 with the interior wall surface of shell 268. Rod 206 is fixedly secured to the closed end wall of bellows 272 and coaxially extends through the open end of shell 268 and bellows 272 and through the open end of cylinder 220 and into the meter casing boss 214.

In order to sense the temperature of the line fluid which is to be metered, a thermostatic bulb 280 (FIGURE 3) is preferably secured in the inlet port 282 of the meter such that the bulb is positioned directly in the path of the fluid stream passing through the meter to assure a fast reaction to temperature changes of the fluid being metered. Bulb 280 is connected to bellows chamber 276 by means of a flexible tube 284 so as to provide for fluid communication therebetween.

In order to facilitate free sliding movement of cylinder 220 in boss 218, tube 284 terminates in a block 286 which is secured to shell 268 and extends through slot 263 in cylinder 220. An inlet port 288 formed in block 286 interconnects tube 284 with chamber 276. Chamber 276 and bulb 280 are filled with a temperature responsive liquid such as acetone and defines with tube 284 a closed fluid tight system so that expansion and contraction of the liquid in the system as a result of temperature change to which bulb 280 is subjected, causes a corresponding axial expansion or contraction of bellows 272. Thus, an increase in line fluid temperature causes the liquid in bulb 280 and chamber 276 to expand, producing pressure which acts axially on closed shell end 270 abutting retainer 240 and which also acts on the axially closed end of bellows 272. The bellows 272, being weaker than spring 242, is compressed, thus increasing the volume of chamber 276 and causing outward movement of rod 206 which is mounted for axial displacement relative of cylinder 220.

Due to the locations of chamber 276 and of bulb 280, an increase in ambient temperature causes the volume of liquid in chamber 276 and in bulb 280 to expand and unless compensated for, this increase in volume resulting from an ambient temperature change axially shifts rod 206 outwardly to produce a corresponding change in the output speed of the variable ratio drive mechanism governing the speed of the register drive shaft, even though there is no change in the temperature of the line fluid being metered. As a consequence, an error would normally be introduced into the register reading.

With the present unit 200, however, as the ambient temperature increases, the liquid in chamber 256 responds to the ambient temperature change to increase the volume of chamber 256, and to compress bellows 252 thereby shifting rod 258 to the left, as viewed from FIGURE 8, and causing axial movement of cylinder 220 to the left. Movement of cylinder 220 to the left, against the bias of spring 242, increases the volume of chamber 276 to reduce the pressure of the expanding liquid in chamber 276 that would otherwise cause outward movement of rod 206. Thus, it will be appreciated that increases in ambient temperature are compensated for by bellows unit 248 to provide for a coordinated unitary movement of rod 206. As a consequence, movement of rod 206 by variations of ambient temperature alone is precluded.

Similarly, when there is a reduction in the ambient temperature, the liquid in chamber 276 and in bulb 280 responds by contracting. By reducing the liquid volume in chamber 276 and bulb 280, the liquid pressure in chamber 276 tends to reduce, and would normally cause inward movement of rod 206, unless compensated for. Since the liquid in chamber 256 of bellows unit 248 also responds to the diminution of ambient temperature, the volume of chamber 256 will be correspondingly reduced allowing for axial expansion of bellows 252 and consequent inward movement of rod 258. Inward movement of rod 258 causes cylinder 220 to be axially displaced to the right. By movement of cylinder 220 to the right, as viewed from FIGURE 8, shell 268 of bellows unit 264 also is shifted to the right by a corresponding magnitude under the bias of spring 242. Movement of shell 268 to the right reduces the volume of chamber 276 to restore a liquid pressure in chamber 276 that is sufficient to prevent expansion of bellows 272 and consequent inward movement of rod 206 which would otherwise result from a reduction in ambient temperature.

Thus, it will be appreciated that although the temperature and consequently the volume of the liquid in bulb 280 and chamber 276 is subjected to variations in ambient temperature, rod 206 is axially shifted independently of ambient temperature changes and responds only to changes in the temperature of the line fluid being metered.

With the structure thus far described, it will be appreciated that unit 200 is operable over wide predetermined line fluid and ambient temperature ranges in which the lower and upper limits are, in addition to other factors, generally fixed by the structural limits of bellows 272 and bulb 280. With mechanical linkages of the type corresponding to linkage assembly 207, the movement of the components of the linkage assembly is limited in both directions corresponding to expansion and contraction of bellows 272. Under certain conditions, a contraction of bellows 272 resulting from an increase in line fluid temperature may consume all of the travel of the linkage assembly 207 in one direction. Movement of rod 206 beyond this limit, therefore, would then be forcibly restrained by linkage assembly 207.

If the line fluid temperature continues to increase, an additional increment of pressure is applied to bellows 272 acting to force rod 206 and linkage assembly 207 beyond their limits of travel. As a consequence of bulb 280 and bellows 272 being structurally weaker than linkage 207, the added force applied by the increase in fluid pressure in chamber 276 would result in the structural failure of either the bulb or the bellows.

Under conditions where bellows 272 is expanded by a resulting decrease in line fluid temperature to cause a movement of rod 206 which consumes all of the travel of linkage assembly 207 in a corresponding direction, then further reduction of line fluid temperature would not result in a corresponding displacement of rod 206 and expansion of bellows 272 since rod 206 and bellows 272 would be restrained against additional movement by linkage assembly 207. As a consequence, no adjustment of cam 88 reflecting the additional reduction of temperature would take place and an error would then be introduced into the meter readings.

In order to obviate the foregoing conditions which occur when all of the movement of linkage assembly 207 is consumed in one direction or the other, the position of linkage assembly 207 is initially adjusted or calibrated by calibration unit 238 to insure that the expected range of line fluid temperature variations does not consume all of the travel of assembly 207.

Heretofore, the initial calibration or adjustment of conventional meter temperature compensation units of the general type described herein, and more particularly of the type described in the Marsh Patent No. 2,438,934 was accomplished by means of a dial indicator which had to be mounted on the meter by means of a special attachment bracket each time it was desired to make an adjustment. After the desired calibration of the temperature compensator was made, the indicator and attachment then had to be removed to facilitate normal operation of the meter.

Since various conditions require the meter temperature compensation mechanism to be calibrated at the situs of the meter rather than during assembly of the meter at the manufacturing plant, it will be appreciated that the foregoing conventional procedure is particularly time-consuming in addition to requiring skilled workmanship in order to assure accurate results.

With the present invention, the foregoing difficulties in calibrating linkage assembly 207 are eliminated by means of the calibration unit 238 which comprises an annular internally threaded nut 300 mounted in housing 212 in concentric spaced apart surrounding relationship with cylinder 220, as best shown in FIGURES 8 and 11. Nut 300 is secured to housing 212 as by screws 302 (FIGURE 11).

With continued reference to FIGURE 8, an annular adjustment screw 304 is threadedly engaged in nut 300 and slidably receives cylinder 220 such that cylinder 220 is axially shiftable relative to screw 304 and normally extends beyond the left-hand end face of screw 304. An indicator collar 306 is fixedly secured to adjustment screw 304 by means of a socket type set screw 308 which is threadedly received in a radially tapped bore in collar 306 and which has a smooth extension 310 interfittingly projecting into a recess formed in screw 304. By this structure, set screw 308 may be readily threaded out of collar 306 such that the extension 310 clears the recess in adjustment screw 304 to enable collar to be freely turned relative to the adjustment screw. Collar 306 axially extends over a reduced diametered section 312 of nut 300 and is provided with suitable indicia 313 which is calibrated in proper temperature units to represent degrees F. and which cooperates with an index line not shown on section 312 to indicate the axial length of screw 304 which is threadedly engaged in nut 300.

As best shown in FIGURE 8, adjustment screw 304 is provided with an annular outwardly opening recess at its right-hand end which forms a radially extending annular shoulder 314. In assembled relationship of the component parts of unit 200, shoulder 314 abuts the free ends of spring retainer arms 228 and 230 thereby holding retainer 226 against displacement to the left.

With the structure thus far described, it will be appreciated that the arms 228 and 230 of retainer 226 are resiliently urged into abutting relationship with shoulder 314 by spring 242. By threading adjustment screw 304 into nut 300, retainer 226 is displaced to the right against the bias of spring 242 as viewed from FIGURE 8, axially displacing retainer 240, cylinder 220 and rod 258 to the right as viewed from FIGURE 8.

As a consequence of displacing retainer 226 to the right, shell 250, being acted upon by the fluid pressure in chamber 256, is shifted to the right by an equal magnitude and remains in abutment with retainer 226. Thus, the movement of rod 258 to the right restores the original volume in chamber 256 which prevailed prior to calibration.

Displacement of retainer 240 to the right, as viewed from FIGURE 8, by threading adjustment screw 304 into nut 300 also axially shifts shell 268 to the right by the same magnitude to reduce the volume in chamber 276 and thereby increase the pressure acting on bellows 272. Under the influence of the increased fluid pressure, bellows 272 is contracted, moving rod 206 outwardly by a corresponding magnitude until equilibrium conditions are re-established.

From the foregoing, it will be appreciated that by threading adjustment screw 304 into nut 300, the entire dual bellows assembly including cylinder 220, retainers 226 and 240, rods 258 and 206, shells 250 and 268, and bellows 252 and 272 are displaced to the right as a unit by a magnitude equal to the axial displacement of adjustment screw 304. Displacement of rod 206 causes a corresponding displacement of linkage assembly 207 to locate assembly 207 in a selected position intermediate its variations imposed on the temperature compensator during operation of the meter will not consume all of the movement of linkage assembly 207 in one direction or the other.

Depending upon line fluid temperature conditions, it may be desired to thread adjustment screw 304 out of nut 300. By this operation, retainer 226, being acted on by spring 242 is displaced to the left, as viewed from FIGURE 8. This results in the displacement of the entire dual bellows assembly to the left as a unit including cylinder 220, retainers 226 and 240, rods 258 and 206, shells 250 and 268, and bellows 252 and 272, similar to the manner hereinbefore described with respect to displacement of the dual bellows assembly to the right. As a consequence, rod 206 is shifted axially to the left by a magnitude equal to the axial displacement of adjustment screw 304 to cause a corresponding displacement of linkage assembly 207.

From the foregoing, it will be appreciated that by either threading adjustment screw 304 into or out of nut 300, rod 206 is respectively axially shifted to the right or to left, as viewed from FIGURE 8, to set the position of linkage assembly 207. By initially setting the position of assembly 207 normal operation of the temperature compensation unit is facilitated without exceeding the limits of travel of assembly 207, to thereby eliminate possible structural damage to bulb 280 and bellows 272 or the possible introduction of error in the adjustment of the meter readings.

Thus, by means of the foregoing adjustment construction, it will be appreciated that the calibration of unit 200 is conventionally and accurately effectuated at the situs of the meter without accessories such as special mounting brackets and indicator dials.

With continued reference to FIGURES 8 and 11, a cup-shaped cover 318 is removably mounted on housing 212 as by screws 320 to enclose and protect the components of unit 200 and to facilitate ready access to calibration unit 238. In order to prevent rotation of cylinder 220, a pair of parallel spaced apart rigid pins 322 and 324 are provided for and are secured in parallel bores formed in nut 300. Pins 322 and 324 project inwardly from the inner periphery of nut 300 in a common plane extending normal to the longitudinal axis of cylinder 220 and abuttingly straddle arm 230 of retainer 226.

By this constructon, rotation of retainer 226 is prevented. Since retainer 226 extends through slots 234 and 236 and beyond cylinder 220 on both sides thereof, the edges of cylinder 220, consequently, are held against rotation with retainer 226.

It will be appreciated that bellows 272 is subject to the pressures exerted by the liquid in chamber 276 and consequently is required to be constructed with walls of sufficient thickness to prevent structural failure as a result of the external forces exerted upon the bellows in opposition to the liquid pressure. In determining the structurally safe magnitude of the bellows wall thickness, the external forces acting through rod 206 must be taken into consideration which oppose the pressure of the liquid in chamber 276. To this end, the forces acting through linkage assembly 207 between the variable ratio drive mechanism and rod 206 which tend to urge rod 206 to the left, as viewed from FIGURE 8, cause bellows 272 to expand axially against the opposing pressure exerted by the relatively incompressible liquid in chamber 276.

As a consequence, it will be appreciated that the greater the external forces acting to urge rod 206 inwardly against the liquid pressure in chamber 276, the greater the wall thickness of bellows 272 is required to preclude radial deformation of the bellows and consequent structural failure thereof.

In adapting unit 200 to the meter temperature adjusting structure of the Marsh Patent No. 2,438,934, it was found that an appreciable force was exerted through the linkage connecting the variable ratio drive mechanism with rod 206, particularly since the lever mechanism having the adjustable mechanical advantage for selectively changing the degree of movement of the linkage in compensating for the fluid coefficient of expansion was in series relationship with the other component parts of the linkage. Thus, forces imparted to the linkage from the end of the linkage connected to the variable ratio drive mechanism were transmitted through the lever mechanism to urge rod 206 inwardly against the opposing forces exerted by the liquid in chamber 276. When the lever mechanism was adjusted to provide a mechanical advantage to compensate for variations in the coefficient of expansion of the fluid being metered, the forces exerted through the linkage to urge rod 206 inwardly against the pressure liquid forces in chamber 276 were appreciably magnified or multiplied, thus requiring a bellows of substantial wall thickness to withstand the greatly magnified forces acting to urge rod 206 inwardly and to axially expand bellows 272 against the opposing liquid pressure forces.

By increasing the thickness of bellows 272, the magnitude of deflection per unit line fluid temperature change is correspondingly diminished with the result that a relatively large temperature change was required to cause sufficient deflection to take up the play in the linkage connections and to initiate sufficient movement of cam member 88 to provide for a compensating control of the output speed of the variable ratio drive mechanism. It will be appreciated that this correspondingly reduces the accuracy of the meter in registering the proper volume of fluid passing through the meter in that a substantially large temperature change is required to overcome play and friction in the linkage and to initiate sufficient movement of the cam member 88 to facilitate control of the variable ratio drive output.

In accordance with the present invention, the special motion transmitting linkage assembly 207 interconnecting the output of the variable speed ratio drive mechanism and rod 206 is provided which retains the feature of adjusting the degree of movement of portions of linkage assembly 207 by a lever mechanism to compensate for variations in the coefficient of expansion of the fluid being metered, but which eliminates the magnification of the forces exerted on rod 206 when the lever mechanism is adjusted to provide for a mechanical advantage. As will become apparent as the description proceeds, the reduction of the magnitude of external forces acting through linkage assembly 207 on rod 206 to urge rod 206 to the left, as viewed from FIGURE 8, against the opposing forces exerted by the pressure liquid in chamber 276, allows bellows 272 to be constructed with a wall thickness of relatively small magnitude so that the deflection of bellows 272 per unit temperature change is materially increased, thereby making bellows 272 extremely sensitive to changes in temperature. Thus, according to the present invention, a relatively small temperature change will cause an appreciable deflection of bellows 272 that is sufficient to initiate a controlling movement of cam member 88 and to thereby facilitate extremely accurate control of the speed of the variable ratio drive mechanism output in response to temperature variations of the fluid being metered.

With reference now to FIGURES 2, 3, 5 and 10, and in accordance with the present invention, linkage assembly 207 comprises a carriage 350 having a base section 354 mounted for free reciprocal sliding movement in the meter housing on a pair of longitudinally spaced apart blocks 357 and 358 which are formed with ways or slide guides to permit reciprocation of carriage 350 along the axis of rod 206 but which restrains lateral movement of the carriage transverse to the rod axis. Carriage 350 has a pair of upstanding parallel tabs 360 and 364 formed integral with and at opposite longitudinal ends of base 354. Tabs 360 and 364 respectively are formed with aligned apertures 372 and 376. Respectively fixedly mounted with a press fit in apertures 372 and 376 are bushings 377 and 378. Rod 116 is axially slidably mounted in bushings 377 and 378 and extends at both ends beyond the opposed faces of tabs 360 and 364. The left-hand end of rod 116 as viewed from FIGURES 2 and 3 is slidably received in a sleeve 380 which is coaxially and non-rotatably fixed to the outer end of rod 206 as by a pin 382 and which has a right-hand planar end face in abutment with the axial end face of bushing 377 as best shown in FIGURE 10. Bushing 377 and sleeve 380 are freely slidably received for axial movement in a bore 384 formed in an exterior section 386 of the meter casing.

As best seen from FIGURE 10, the left-hand end of rod 116 is axially spaced apart from the opposing end of rod 206 so that movement of rod 206 is not directly imparted As best shown in FIGURES 2 and 3, bushing 378 has an enlarged cylindrical head 392 and an annular flange 394 extending radially outwardly of head 392. A coil spring 396 extending through an opening 398 in the meter casing is seated over head 392 and bears against flange 394. The other end of spring 396 is seated over a boss portion 400 of an adjusting nut 402 so to react against nut 402 to urge carriage 350 to the left as viewed from FIGURE 2. Nut 402 is rotatably supported in an opening 408 formed in a section 410 of the meter casing which is enclosed by a cover 412 detachably secured by screws 414 to the meter housing as best shown in FIGURE 2. Nut 402 has an enlarged cylindrical section 416 forming an annular radially extending shoulder 418 which is biased by spring 396 into bearing relationship against the inside surface of a rigid flat sided annular plate 420 held fixedly in place between cover 412 and casing section 410 by screws 422 to thereby hold nut 402 axially in place.

Nut 402 has a central axially extending through bore 430 and a diametrical slot 432 extending inwardly from the left-hand planar end face 434 of boss portion 400. Rod 116 is freely rotatably received in bore 430 and carries a pin 438 adjacent its right-hand end which protrudes at both ends beyond the periphery of rod 116 and extends into slot 432 to prevent rod 116 from being turned about its axis relatively to nut 402.

By this structure it will be appreciated that spring 396 reacts against the enlarged head section 416 of nut 402 to hold it axially in place against plate 420 and urges carriage 350 to the left as viewed from FIGURE 2. Since bushing 377 carried by carriage 350 abuts sleeve 380 which is fixed to rod 206, the force of spring 396 is transmitted directly to bellows 272 through carriage 350, bushing 377, sleeve 380 and rod 206 in series without being magnified or multiplied since there is no mechanical lever in this part of the linkage. Thus, carriage 350 which is slidable in the meter casing is urged to the left by the force exerted by spring 396, which force is opposed by the liquid pressure force exerted on bellows 272. Consequently, carriage 350 will be axially positioned in the meter casing depending upon the relative magnitudes of the forces exerted by the pressure liquid on bellows 272 and by spring 396. As the pressure liquid force exerted on bellows 272 is increased, carriage 350 is longitudinally shifted to the right as viewed from FIGURE 2 to compress spring 396 which is of the constant deflection type until the spring is compressed sufficiently to exert an equal and opposite force to hold carriage 350 in position. Thus, it will be appreciated that spring 396 maintains bushing 377 in abutment with sleeve 380 and thereby serves to take up backlash or play in the component parts of the linkage assembly interconnecting rod 206 with carriage 350. Spring 396 thereby maintains a constant pressure on carriage 350 to overcome friction in the linkage assembly so that the slightest movement of rod 206 is transmitted to carriage 350.

It will be appreciated that movement of carriage 350 itself does not cause adjustment of cam 88 since rod 116 which is axially shiftable to effect adjustment of cam 88 is slidably mounted on carriage 350. In order to effectuate axial displacement of rod 116 in response to movement of rod 206 caused by line fluid temperature variations, a stud 450, as shown in FIGURES 2-4, similar to and axially spaced from stud 120 has a body portion 452 formed with a through bore 454 through which rod 116 freely rotatably extends. Stud 450 is axially retained in place on rod 116 between a sleeve 458 fixedly mounted on rod 116 as by a pin 459 (FIGURES 2 and 3) and a retainer ring 462 received in an annular groove formed in the outer periphery of rod 116.

Stud 450 is provided with a lug 464 having a round cross section and extending downwardly from and integral with body 452 and slidably protruding through a slot 468. Slot 468 is formed inwardly of the outer end of a horizontally extending arm portion 470 of a U-shaped motion transmitting lever 472 as best shown in FIGURES 4 and 6.

With continued reference to FIGURES 4 and 6, lever 472 is formed with an upper arm portion 474 extending parallel to arm portion 470 and integrally connected thereto by a cross piece 476 extending perpendicularly between arm portions 470 and 474. Lever 472 is pivotally mounted on a vertical stud 480 fixedly received at its lower end in a bore 482 formed in a section 484 of the meter casing and extending upwardly in perpendicular relationship to arm portions 470 and 474 through axially spaced bushings 486 and 488 which are fixedly received in aligned apertures formed respectively in arm portions 470 and 474.

By this structure it will be appreciated that pivotal movement of lever 472 about the axis of stud 480 axially displaces stud 450 together with rod 116, the stud lug 464 being freely slidable back and forth in slot 468 as lever 472 is rocked back and forth in a horizontal plane.

In order to transmit the unitary movement of carriage 350 and rod 206 to motion transmitting lever 472 to thereby pivot lever 472 and axially displace rod 116, a rigid connecting link 492 is provided and has a flat sided plate portion horizontally overlying and vertically spaced above carriage 350 and swingably supported on an upstanding pivot 494 carried by carriage base section 354. Pivot 494, as best shown in FIGURE 10, projects rigidly upwardly from the top face 496 of carriage 350 and has an annular shoulder 498 formed by a reduced diameter end section 500. End section 500 is rotatably received in an aperture 502 formed in link 492 adjacent the left side thereof as viewed from FIGURE 2, so that link 492 is supported on shoulder 498. A snap ring and washer assembly 504 wherein the snap ring is received in an annular groove formed in the outer periphery of end section 500, holds link 492 axially in place on pivot 494.

As seen from FIGURE 2, link 492 extends generally horizontally to the right from pivot 494 between rod 116 and upper arm 474 of lever 472 which straddles rod 116 as best shown in FIGURE 4. As best shown in FIGURES 4 and 9, link 492 is provided with a flat bottom surface which bears against the top flat surfaces of studs 120 and 450 to prevent studs 120 and 450 from turning when rod 116 is rotated. Thus, by manipulation of nut 402, rod 116 is rotated to cause stud 120 in threaded engagement with rod 116 to be shifted in a selected axial direction. Since stud 450 freely receives rod 116, stud 450 remains in its axial position when rod 116 is rotated and stud 120 is shifted.

As best shown in FIGURES 2 and 3, the right-hand end of link 492 is supported on carriage 350 in slidable surface abutment with the flat top edge of carriage tab 364. As shown in FIGURES 4 and 6, upper lever arm 474 is substantially longer than lower arm 470 for a purpose as will presently become apparent and has an arcuate slot 506 formed generally longitudinally of the arm with opposed edges generally equidistant from the center of slot 468 in lower arm 470. Freely slidably received in slot 506 is a stud 508 fixed to and projecting upwardly from link 492 near the right-hand end thereof to establish a motion transmitting connection between link 492 and lever 472. By means of this structure, link 492 is swingable about pivot 494 to arcuately shift stud 508 from one end of slot 506 to the other end thereof.

In order to hold stud 508 fixed in a selected adjusted position in slot 506, link 492 is provided with an integral rigid laterally projecting arm 510 extending substantially at right angles to link 492. Arm 510 terminates in an indicating pointer 512 which is offset in a plane below and parallel to link 492. Fixed to the outer end of indicating pointer 512 is a clamping screw 514 which extends downwardly and through an arcuate slot 516 formed in a horizontally extending extension 518 underlying arm 510 and formed integral with carriage base 354 at right angles thereto. Indicating pointer 512 is adapted to be fixed by manipulation of clamping screw 514 to the adjacent free end of extension 518 and is adapted to swingably move about the axis of stud 494 upon loosening screw 514 over a fixed scale 520 on the top face of extension 518 for indicating the adjusted position of stud 508 in slot 506 preferably in terms of different fluid coefficients of thermal expansion.

By means of this construction, stud 508 is selectively shiftable to a fixed position in slot 506 corresponding to the coefficient of thermal expansion of the fluid to be metered by manipulating clamping screw 514 to allow indicating pointer 512 to be shifted about the axis of pivot 494 to a desired scale reading on scale 520 and by reclamping screw 514 in slot 516 to fix link 492 with stud 508 in adjusted position.

It will be appreciated that the radii of slot 506 and of slot 516 are taken about coincident geometric centers located at the axis of pivot 494 to facilitate free swinging movement of stud 508 in slot 506.

By this construction, the angular position of connecting link 492 and consequently, the position of stud 508 in slot 506 is adjustable and by manipulation of clamping screw 514, link 492 is fixedly securable in its adjusted position on carriage 350 thereby limiting link 492 to longitudinal movement with carriage 350. It will be appreciated that as stud 508 is shifted toward the outer end of slot 506 and away from lever pivot 480, the arcuate movement of lever 472 in response to a corresponding longitudinal movement of connecting link 508 is proportionately diminished. In the position of the component parts shown in FIGURE 2, stud 508 is positioned in slot 506 adjacent to the end nearest pivot 480 and for a given longitudinal movement of link 492 together with carriage 350, stud 508 slides in slot 506 away from pivot 480 and swings lever 472 about pivot 480 by a given angular distance. By now adjusting stud 508 to a position in slot 506 that is further away from pivot 480, the angular distance through which lever 472 is swung for the same given longitudinal movement of link 492 is diminished. Thus, the angular distance through which lever 472 is swung for a given longitudinal displacement of link 492 is inversely proportional to the distance between stud 508 and the lever pivot axis 480. As a consequence, by adjusting the position of stud 508 in slot 506, more or less axial displacement is imparted rod 116 for a given magnitude of longitudinal movement of link 492 together with carriage 350. By means of this adjustment, therefore, the displacement of rod 116 and consequently, cam 88 may be selectively varied in comparison to the unitary longitudinal movement of bellows rod 206, carriage 350 and link 492 to compensate for variations in coefficients of thermal expansion of different fluids desired to be metered.

Thus, to change the proportion of movement of rod 116 to movement of carriage 350 and thereby compensate for changes in the coefficient of thermal expansion of the fluid being metered, pointer 512 on link 492 is moved along the graduations on scale 520, causing the position of stud 508 to be shifted in slot 506 of link 492. In this manner, arm 474 acts as an adjustable lever arm and the distance between pivot 480 and stud 508 is varied, thus requiring greater or lesser movement of carriage 350 and link 492 to obtain a movement of given magnitude of movement of lever 472 and, consequently, of rod 116.

It will be appreciated that when link stud 508 is aligned vertically above rod stud 450, which is at a position approximately equidistant between opposite terminal ends of slot 506, the displacement of rod 116 will be equal to the magnitude of displacement of rod 206. By shifting stud 508 is one direction or the other in slot 506, the displacement of rod 116 is correspondingly increased or diminished for the same magnitude of displacement of rod 206. Thus, shifting stud 508 from the center of slot 506 to the position shown in FIGURE 2 provides a positive maximum mechanical advantage and shifting stud 508 in the opposite direction outwardly from pivot 480 provides a negative advantage.

In the automatic operation of the temperature compensating device herein described, bellows unit 200 senses both ambient and line fluid temperatures to impart a coordinated unitary movement to rod 206 from bellows 272 and 252. Axial displacement of rod 206 is transmitted through sleeve 380 to carriage 350 and link 492 in an adjusted fixed position on carriage 350. Rod 206, carriage 350 and link 492 in a selected adjusted fixed position on carriage 350 all move as a unit. Motion of link 492 is transmitted by stud 508 to rotate lever 472 which axially displaces rod 116 which is freely slidable in carriage 350 by a magnitude corresponding to the axial movement of rod 206 and to the position of stud 508 in slot 506. Axial displacement of rod 116 varies the eccentric position of cam 88 as hereinbefore described to effect a change in the ratio of the output speed to the input speed of the variable drive mechanism thereby introducing the necessary and highly accurate compensation factor for causing the meter register to record the volume of fluid flowing through the meter in terms of what its volume would be at a standard reference temperature.

Spring 396 biasing carriage 350 to the left as viewed from FIGURE 2, acts directly on bellows unit 200 with a constant, unmultiplied force and by acting on the carriage 350, spring 396 thereby acts through link 492, lever 472, and stud 508 to hold rod 116 and cam 88 in adjusted position against the intermittent opposing forces created by the variable ratio drive mechanism. The force exerted by spring 396 is opposed by the force exerted by spring 242 and the force exerted by spring 242 is such that it overrides that of spring 396 to prevent a floating action of linkage 207 from occurring.

Since the force exerted by spring 396 is not transmitted serially through link 492 and lever 472, the adjustment of the mechanical advantage established by changing the position of stud 508 in slot 506 does not alter or magnify the spring force imposed on rod 206 and consequently bellows 272. Thus, adjustment of movement of rod 116 may be accomplished to compensate for differences in coefficients of thermal expansion of dissimilar fluids desired to be metered without magnifying or multiplying the force exerted by spring 396 on bellows unit 200.

Manual adjustment of the variable ratio drive mechanism may also be accomplished by rotating nut 402. Since rod 116 has pin 438 extending through slot 432 in nut 402, rod 116 will rotate with nut 402. Stud 120 being held against rotation and threadably engaged with rod 116 will therefore, move longitudinally along rod 116 in response to rotation of rod 116. Stud 450 will remain axially in the position since rod 116 is freely rotatable in bore 454.

In order to initially calibrate the meter after it has been installed or to re-calibrate the meter after the thermostatic bulb 280 is replaced to meet a change in temperature conditions, adjustment screw 304 is turned to shift rod 206 and, consequently, carriage 350 until a notch 530 in carriage 350 aligns with a notch 532 formed into the meter casing as best shown in FIGURES 2 and 5. The alignment of notches 530 and 532 may readily be determined by the insertion of any suitable tool such as a rectangular flat sided location key (not shown). When the location key is freely slidable through notches 530 and 532, then the operator is assured that the notches are in alignment. With these positions of the temperature compensator components, the register 47a will operate as though the line fluid were at 60° F.

If the line fluid is determined to be 60° F., no further adjustment is required. If, however, the line fluid measured has a temperature that is different from 60° F., then it is necessary to adjust the setting of collar 306. This is accomplished, as hereinbefore described, by loosening set screw 308 and by rotating collar 306 relative to adjustment screw 304 until the zero setting of the indicator 313 on collar 306 aligns with the index marker (not shown) on nut 300.

After setting collar 306, set screw 308 is retightened and collar 306 and adjustment screw 304 are turned as a unit until the indicia setting on collar 306 which corresponds to the measured line fluid temperature is aligned with the index marker on nut 300.

As hereinbefore described, by threading adjustment screw 304 into or out of nut 300, rod 206 is shifted by a corresponding magnitude to thereby shift carriage 350 by an equal distance which sets the adjustment of cam 88 to correspond with the initial measured temperature of the line fluid. With this adjustment, the linkage 207 is set to a position intermediate its physical limits of travel in opposed directions and the meter is now operable over a predetermined range of temperature variations with the assurance that increases and decreases of the temperature acting on bellows 272 will not consume the entire travel of the components of linkage 207 in either direction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter having a metering element fluid driven member and a register drive member, a driving connection coupling said driven and drive members and comprising a variable speed transmission mechanism having an input connected to said metering element driven member and an output connected to said register drive member; and means for controlling the driving ratio of said mechanism in response to the temperature of the fluid being metered including a linearly-movable member mounted for predetermined movement in response to variations in the temperature of the fluid being metered, a link mounted for unitary movement with said member and being pivotally adjustable to a fixed angular position with respect to said linearly movable member, a pivotally mounted lever member operably connected to said mechanism and operable upon pivotal movement thereof to vary said driving ratio, and motion transmitting means interconnecting said link and said lever member for transmitting movement of said linearly-movable member to swing said lever member about its axis, said motion transmitting means being operable by adjustment of the angular position of said link to vary the angular distance through which said lever member is pivoted in response to movement of said linearly-movable member.

2. An apparatus adapted to be connected to the driving ratio regulating mechanism of a variable ratio change speed transmission for varying the driving ratio of said transmission, said apparatus comprising: a reciprocable member mounted for displacement along a fixed axis in opposite directions in response to variations in a measurable regulatory condition; a pivotable member rockably mounted about a fixed axis for swinging movement through an adjustable angle means operably connecting said pivotal member to said regulating mechanism for varying the driving ratio of said transmission; and selectively adjustable means operably interconnecting said reciprocable and pivotable members for transmitting the motion of said reciprocable member to said pivotable member and for selectively varying the magnitude of movement imparted to said pivotable member in response to a given magnitude of movement of said reciprocable member, said selectively adjustable means comprising a link carried by said reciprocable member and being pivotally adjustable to a fixed angular position on said reciprocable member, and means pivotally connecting said link to said pivotable member.

3. In combination with a variable ratio change speed device having a regulating mechanism for varying the driving ratio of said device, means for controlling the operation of said regulating mechanism and comprising: a reciprocable member movable in predetermined directions in response to variations in a measurable regulatory condition, and a motion transmitting linkage operable to transmit motion of said reciprocable member to control the operation of said regulating mechanism in accordance with variations in said regulatory condition, said motion transmitting linkage including a carriage mounted for reciprocable movement in alignment with said reciprocable member and being connected to said reciprocable member by separable abutting surfaces, resilient means continuously exerting a force to bias said carriage into surface abutment with said reciprocable member and means constantly urging said reciprocable member against said biasing force thereby facilitating movement of said carriage and said reciprocable member as a unit; a further member slidably mounted on said carriage for linear movement relative to that of said carriage and being operably connected to said regulating mechanism; and linkage means for transmitting the motion of said carriage to said further member for varying said driving ratio of said regulating mechanism said linkage means including a selectively adjustable lever mechanism for varying the magnitude of movement imparted by said carriage to control said regulating mechanism.

4. In a fluid meter, a rotatable fluid driven member; a rotatable register driving member; a change speed mechanism coupling said driven and driving members to rotate said driving member in response to rotation of said driven member and capable of an infinite number of driving ratio variations within a predetermined range; thermostatic means having a motion transmitting member movable in response to temperature changes of the fluid being metered and being normally urged in a predetermined direction by fluid temperature produced forces; and a motion transmitting linkage operably interconnecting said motion transmitting member with said mechanism for transmitting movement of said motion transmitting member to vary the driving ratio of said mechanism and thereby compensate for temperature variations of the fluid being metered, said linkage comprising a first linkage section having a reciprocal member mounted for unitary movement with said motion transmitting member, a second linkage section formed independently of said first linkage section and operably interconnecting said first linkage section with said mechanism to transmit motion of said first linkage section to said mechanism, said second linkage section including a lever having an adjustable fulcrum and means for selectively adjusting said fulcrum to vary the lever arm ratio of said lever in proportion to the coefficient of expansion of the fluid being metered to thereby condition said change speed mechanism for fluids of different coefficients of expansion; and yieldable means continuously urging said first and second linkage sections in a direction opposing said predetermined direction and exerting a serially transmitted spring force only through said first linkage section and said motion transmitting member with said second linkage section being free of spring forces acting serially therethrough in opposition to said temperature produced forces, said means for adjusting said lever arm fulcrum comprising a link mounted for unitary movement with said reciprocable member and being pivotally adjustable to a selected fixed angular position on said reciprocable member, and a motion converting pin and elongated slot connection connecting said link to said lever to convert the reciprocable movement of said link for rotating said lever, said lever being pivotal about a fixed axis offset from said lever fulcrum.

5. The fluid meter as defined in claim 4, wherein said thermostatic means comprises an axially expansible and compressible bellows element operably connected to said motion transmitting member and disposed in a chamber, said chamber being filled with an expansible thermosensitive liquid which is subjected to temperature variations of the fluid being metered to thereby cause said bellows element to axially expand and compress as the temperature of the fluid being metered respectively decreases and increases.

6. The fluid meter as defined in claim 4, wherein said thermostatic means comprises a first axially expansible and contractible thermostatic element movable in response to temperature variations of the fluid being metered and being subjected to ambient temperature variations, a second axially expansible and contractible thermosensitive element axially aligned with said first thermostatic element movable in response only to temperature variations in the surrounding ambient air, and means for coordinating the movement of said first and second elements to produce a single unitary movement acting on said motion transmitting member which substantially corresponds only to temperature variations of the fluid being metered free from any effects caused by variations in ambient temperature.

7. An apparatus for controlling the driving ratio of a variable ratio change speed mechanism comprising sensing means having an element linearly movable in response to a measurable variable regulatory condition, a reciprocable member spring biased for movement with said element as a unit, a pivotable member swingable through a predetermined angle about a fixed pivot axis and operably engaging said change speed mechanism to vary the driving ratio of said mechanism, and adjustable means interconnecting said members for swinging said pivotable member about its axis in response to movement of said reciprocable member and for selectively varying the magnitude of pivotal movement imparted to said pivotable member, said adjustable means comprising a link mounted on said reciprocable member for unitary movement therewith and being adjustably pivotal to a selected fixed angular position, and motion converting means operably interconnecting said link with said pivotal member for transmitting the reciprocable movement of said link to swing said pivotal member about its axis.

8. An apparatus for controlling the driving ratio of a variable ratio change speed mechanism comprising a reciprocable member movable in response to a measurable variable regulatory condition, a lever mounted for swinging movement about a fixed pivot axis and having an adjustable fulcrum, said lever being operable upon swinging movement about said axis to vary the driving ratio of said mechanism in proportion to the magnitude of angular movement through which said lever is swung, and motion transmitting means operably interconnecting said reciprocable member with said lever for swinging said lever about its axis in response to movement of said reciprocable member and for selectively adjusting said fulcrum to vary the lever arm ratio of said lever and thereby vary the magnitude of swinging movement imparted to said lever by movement of said reciprocable member.

9. In a fluid meter having a casing; a variable ratio register drive change speed mechanism and means for controlling the driving ratio of said change speed mechanism and comprising: thermostatic means having a connecting member reciprocable in response to temperature variations of the fluid being metered; and motion transmitting means operable to transmit the movement of said connecting member to said mechanism for varying the driving ratio of said mechanism in response to movement of said connecting member, said motion transmitting means including a first member mounted for reciprocating movement in said casing and being operably connected to said connecting member for unitary movement therewith, a lever swingably mounted about a fixed axis on said casing and having an adjustable fulcrum, said lever being operably connected to said mechanism to vary the driving ratio of said mechanism in proportion to the magnitude of swinging movement imparted to said lever, and motion converting means for selectively adjusting the lever arm ratio of said lever and for transmitting the movement of said first member to swing said lever about its axis.

10. The fluid meter defined in claim 9 wherein said motion converting means comprises an adjustably rockable arm carried only by said first member and means operably connecting said arm to said lever.

11. The fluid meter as defined in claim 9, said first member being connected to said connecting member for aligned movement therewith, and resilient means operably engaging only said first member to exert a force for urging said first member toward said connecting member.

12. The fluid meter as defined in claim 11 wherein said motion converting means comprising a second member mounted for unitary movement with said first member and being adjustably pivotable on said first member to a selected fixed angular position, a pin mounted on said second member at a spaced radial distance from the pivotal axis of said second member and means forming an elongated slot in said lever for receiving said pin at a shiftable radial distance from the pivotal axis of said lever, said force exerted by said resilient means being transmitted serially only through said first member and said connecting member to apply a pull on said second member.

13. The fluid meter as defined in claim 12 wherein said thermostatic means comprises a bellows element which is axially expansible and compressible in response to temperature variations of the fluid being metered and which is operably connected to said connecting member to impart reciprocating movement to said connecting member.

14. The fluid meter as defined in claim 13, wherein said bellows element is responsive to temperature of fluid passing through the meter casing inlet and is affected by ambient temperature variations and wherein said thermostatic means comprises thermosensitive means for sensing the ambient temperature of air surrounding said casing, a third member reciprocable in response to ambient temperature variations sensed by said thermosensitive means, and means for coordinating the movement of said third member and said bellows element to impart a single unitary movement to said connecting member that corresponds only to the temperature variations of the fluid.

15. The fluid meter as defined in claim 14, wherein said change speed mechanism has an axially displaceable rod which is shiftable to effectuate variations in the driving ratio of said mechanism, a pin freely rotatably mounted on said rod and held against axial movement thereon, a slot formed in said lever at a fixed radial distance from the pivotal axis thereof, said rod pin having a portion slidably received in said lever slot to establish a motion transmitting connection between said lever and said rod.

16. In a fluid meter having a casing; a variable ratio change speed register drive mechanism; an axially displaceable rod operable upon displacement thereof to vary the driving ratio of said mechanism, a lever mounted for swinging movement about a pivotal axis fixed to said casing, a motion converting connection operably connecting said rod to said lever at a fixed radial distance from said pivotal axis for transmitting the swinging movement of said lever to axially displace said rod, said lever having an adjustable fulcrum positioned at a selected radial distance from said pivotal axis; adjustable means for selectively adjusting said fulcrum to vary the lever arm ratio of said lever; thermostatic means movable in response to temperature variations of the fluid being metered, and motion transmitting connections operable to transmit movement of said thermostatic means through said adjustable means to swing said lever about its pivotal axis.

17. The fluid meter as defined in claim 16, a pin threadedly mounted on said rod and connecting said rod to said change speed mechanism, and means for manually rotating said rod to axially shift said pin to thereby selectively vary the driving ratio of said change speed mechanism.

18. In a fluid meter having a casing; a variable ratio drive change speed register mechanism and means for controlling the driving ratio of said mechanism comprising: thermostatic means movable in response to temperature variations of the fluid being metered, and motion transmitting means operable to transmit the movement of said thermostatic means for varying the driving ratio of said mechanism in correspondence with the temperature variations of the fluid being metered, said motion transmitting means including a rigid lever having rigid parallel coextensive arm sections swingably mounted about a pivotal axis fixed to said casing, one of said arm sections being operably connected at a fixed radial distance from said pivotal axis to said change speed mechanism for transmitting movement of said lever thereto, the other of said arm sections having a fulcrum positioned at an adjustable radial distance from said pivotal axis, and means for adjusting said fulcrum to selectively vary the lever arm ratio of said lever.

19. In a fluid meter having a housing, a metering element movable in response to fluid flow through said housing, register means for indicating the volume of fluid flow through said housing, and a variable ratio drive mechanism operatively coupling said metering element to said register means: means for controlling the driving ratio of said mechanism including a thermostatic unit having a movable element operatively connected to said mechanism, said thermostatic unit comprising: a casing member, a temperature-sensitive device operable to displace said element in response to temperature variations of the fluid being metered, and temperature calibration means comprising a manually manipulatable member capable of displacement to selectively adjust the position of said movable element, first and second parts respectively having an index marker and a scale, one of said parts being rigid with one of said members and the other of said parts being structurally distinct from both of said members, means securing the other of said parts to the other of said members but permitting selective displacement of said other part relative to said other member to vary the relationship between said scale and marker without displacement of said manually manipultatable member.

20. The fluid meter defined in claim 19 wherein said manipultatable member comprises an annular part adjustably threaded into said casing, said temperature sensitive device being encircled and slidably supported by said annular part in said casing.

21. The fluid meter defined in claim 19 comprising means independent of said calibration means for indicating the position of said linkage which renders said register means operable to indicate volume of fluid being metered at a standard predetermined temperature.

22. The fluid meter defined in claim 21 wherein said means for indicating the position of said linkage comprises a pair of notches respectively formed in said linkage and a relatvely fixed part, said notches being so arranged that they align when said linkage is adjusted to a position corresponding to said standard predetermined temperature.

23. The fluid meter defined in claim 21 comprising means threadedly mounting said manipulatable member on said casing member, said other part being relatively rotatably mounted on said manually manipulatable member, said means securing said other part being selectively manipulatable to releasably fix said other part to said manually manipulatable member.

24. In a fluid meter having a housing, a metering element movable in response to flow of fluid through said housing, register means for indicating the volume of fluid flow through said housing and a variable ratio change speed mechanism drivingly coupling said metering element to said register means, means for controlling the driving ratio of said change speed mechanism including thermostatic means having a movable member and a motion transmitting linkage having limited travel in opposed directions and operably interconnecting said member with said mechanism for varying said driving ratio in accordance with the movement of said member, said thermostatic means comprising a temperature-sensitive unit exposed for reaction to temperature variations of the fluid being metered and to surrounding ambient temperature variations and being operably connected to said member and conditioned in response to line fluid temperature variations to move said member, an ambient temperature responsive unit operably connected to said temperature-sensitive unit to compensate for the reaction of said temperature-sensitive unit to ambient temperature changes so that movement of said member corresponds only to line fluid temperature variations, elongated tubular support means coaxially receiving and mounting said units and having one end thereof slidably extending through an opening in said casing, and adjustment means including a manually manipulatable annular member slidably receiving the other end of said tubular support means and being threadedly mounted in said casing coaxial with said tubular support means, said annular member being manually operable to axially shift said tubular support means together with said units and said movable member to selectively adjust the position of said linkage intermediate its predetermined limits of travel, each of said units comprising a shell slidably received in said tubular support means and an axially expansionable and contractable bellows mounted in each shell to form with the interior of said shell a chamber filled with temperature-sensitive liquid, a rod rigidly connecting said ambient temperature responsive bellows to said support means, a spring biasingly mounted between said shells in engagement with the closed ends thereof and continuously biasing said tubular support means in a direction corresponding to that of said temperature-sensitive unit, said movable rod being rigidly connected to said temperature unit bellows, and means forming engaging surfaces on said annular member against which said spring reacts.

References Cited in the file of this patent
UNITED STATES PATENTS

| | | |
|---|---|---|
| 2,206,540 | Whittaker | July 2, 1940 |
| 2,208,687 | Renfrew | July 23, 1940 |
| 2,358,047 | Birch | Sept. 12, 1944 |
| 2,414,596 | Griffith et al. | Jan. 21, 1947 |
| 2,438,934 | Marsh | Apr. 6, 1948 |
| 2,438,935 | Marsh | Apr. 6, 1948 |
| 2,884,793 | Billeter | May 5, 1959 |
| 3,000,211 | Thuse et al. | Sept. 19, 1961 |

UNITED STATES PATENT OFFICE
CERTIFICATE OF CORRECTION

Patent No. 3,166,937 January 26, 1965

Thomas C. Farrell

It is hereby certified that error appears in the above numbered patent requiring correction and that the said Letters Patent should read as corrected below.

Column 12, line 36, after "imparted" insert -- to rod 116. --; column 15, line 32, for "is" read -- in --.

Signed and sealed this 27th day of July 1965.

(SEAL)
Attest:

ERNEST W. SWIDER
Attesting Officer

EDWARD J. BRENNER
Commissioner of Patents